United States Patent
Rudolf et al.

(10) Patent No.: US 6,661,854 B2
(45) Date of Patent: Dec. 9, 2003

(54) CHANNEL ESTIMATION BY TIME MULTIPLEXED COMPLEMENTARY SEQUENCES

(75) Inventors: Marian Rudolf, Rennes (FR); Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 318 days.

(21) Appl. No.: 09/749,543

(22) Filed: Dec. 28, 2000

(65) Prior Publication Data

US 2001/0006541 A1 Jul. 5, 2001

(30) Foreign Application Priority Data

Dec. 30, 1999 (FR) .............................. 99 16851

(51) Int. Cl.[7] .............................................. H04L 27/06
(52) U.S. Cl. ...................................................... 375/343
(58) Field of Search ................... 375/259, 130, 375/340, 343, 350

(56) References Cited

U.S. PATENT DOCUMENTS

| | | | |
|---|---|---|---|
| 4,353,067 A | | 10/1982 | Mims |
| 4,968,880 A | * | 11/1990 | Beller .................. 250/227.21 |
| 5,341,177 A | | 8/1994 | Roy et al. |
| 5,559,723 A | * | 9/1996 | Mourot et al. .............. 364/517 |
| 5,805,107 A | | 9/1998 | Schroth et al. |
| 5,841,813 A | * | 11/1998 | Van Nee .................... 375/279 |

FOREIGN PATENT DOCUMENTS

WO    WO 00/54424    * 9/2000    ........... H04B/1/707

OTHER PUBLICATIONS

R. Sivaswamy, Multiphase Complementary Codes, IEEE 1978, vol. IT–24, No 5, p.p. 546–552.*
Popovie, Efficient Golay Correlator, IEEE 1999, p.p. 1427–1478.*
Xiang et al , On Aperiodic and Periodic Complemntary Binary Sequences, IEEE 1999, vol. 45, No. 1, p.p. 296–303.*

* cited by examiner

Primary Examiner—Don N. Vo
(74) Attorney, Agent, or Firm—Oblon, Spivak, McClelland, Maier & Neustadt, P.C.

(57) ABSTRACT

A method of estimating qualities of a transmission or telecommunications channel involves using a pair of complementary sequences $s(n)$ and $g(n)$, with $n=0, 1, \ldots, N-1$, which have the property that the sum of their autocorrelations is a perfect Dirac function (that is, $\Phi_{s,s}(n)+\Phi_{g,g}(n)=k\cdot\delta(n)$). A composite signal made up of two complementary sequences $s(n)$ and $g(n)$ is used, after having time multiplexed these two sequences in such a way as to exploit the property $\Phi_{s,s}(n)=\Phi_{g,g}(n)=k\cdot\delta(n)$. The composite signal is made up of two sequences which are concatenated with, between them, a guard interval of a duration greater than or equal to the length of the impulse response of the channel to be estimated.

6 Claims, 3 Drawing Sheets

CHANNEL ESTIMATION BY TIME MULTIPLEXED COMPLEMENTARY SEQUENCES

FIELD OF THE INVENTION

The present invention relates to a method of estimating a transmission or telecommunications channel which uses complementary sequences. The method results in an optimal estimation of the delays, phases and attenuations of the different paths in the case of a single-path or multipath channel.

BACKGROUND OF THE INVENTION

Figure 1:
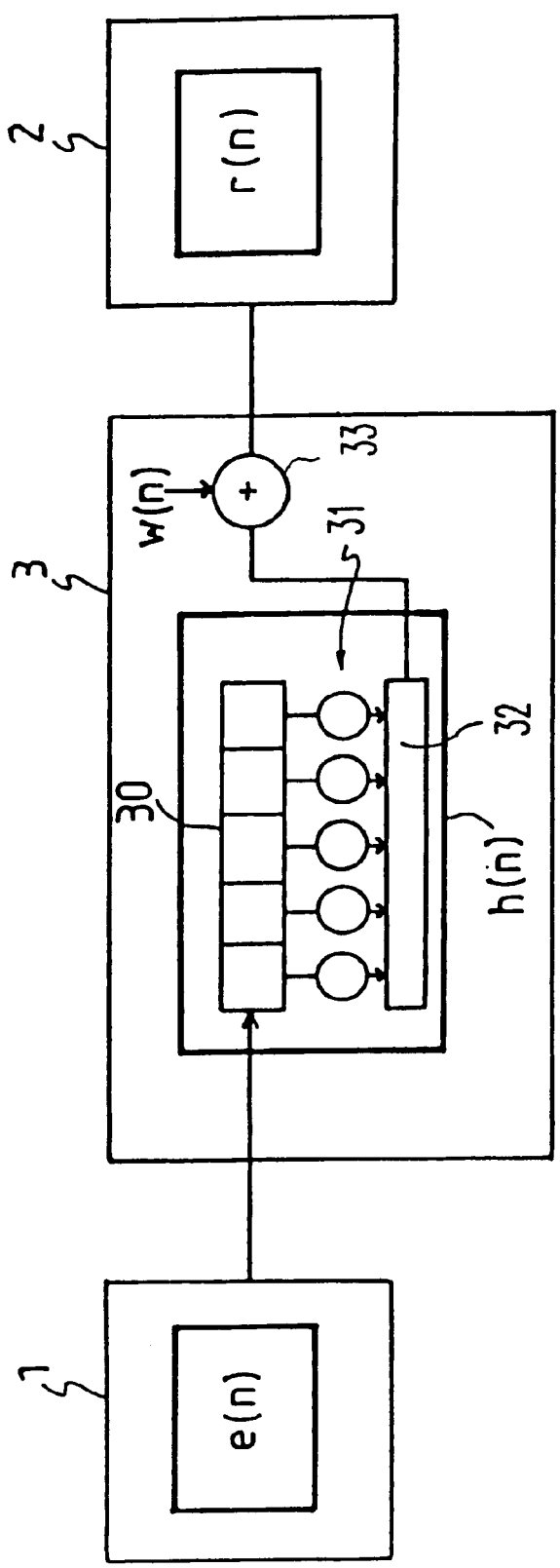

In a telecommunications system, information circulates between transmitters and receivers through channels. In this connection, FIG. 1 illustrates a model, which is discrete in time, of the transmission chain between a transmitter 1 and a receiver 2 through a transmission channel 3. As a general rule, the transmission channels can correspond to different physical, radio, wire, optical media etc., and to different environments, fixed or mobile communications, satellites, submarine cables, etc.

As a result of the multiple reflections of which the waves emitted by transmitter 1 can be the object, channel 3 is a multipath channel which is generally modelled as FIG. 1 indicates. It is then considered to be a shift register 30 comprising L serial cells (referred to by a subscript k able to take values of between 1 and L) and the contents of which slide towards the right of FIG. 1 each time a symbol arrives at its input. The output of each cell with the subscript k is applied to a filter 31 representing the interference undergone by this output and introducing an attenuation of the amplitude $\alpha_k$, a phase shift $\alpha_k$ and a delay $r_k$. The outputs of the filters are summed in a summer 32. The total impulse response thus obtained is marked h(n).

The output of summer 32 is applied to the input of an adder 33 for the addition of a random signal, modelled by a Gaussian white noise, w(n) which corresponds to the thermal noise present in the telecommunications system.

In FIG. 1, the reference h(n) has been used, in channel 3, for the register 30, the filters 31 and the summer 32, followed by an adder 33 which adds the noise w(n).

It will be understood that, if the transmitter 1 transmits the signal e(n), the signal received r(n), in the receiver 2, is thus:

$$r(n) = e(n) * h(n) + w(n)$$

$$= e(n) * \sum_{k=1}^{L} a_k \delta(n - r_k) e^{j\alpha_k} + w(n)$$

$$= \sum_{k=1}^{L} a_k e(n - r_k) e^{j\alpha_k} + w(n)$$

In these expressions $$h(n) = \sum_{k=1}^{L} a_k \delta(n - r_k) e^{j\alpha_k}$$

denotes the impulse response of the channel, $\delta(n)$ being the Dirac impulse and $\delta(n-r_k)$ denoting a delay function of the value $r_k$. The operator * denotes the convolution product, defined by the following relation:

$$c(n) = a(n) * b(n) = \sum_{m=-\infty}^{+\infty} a(m) \cdot b(n - m)$$

Thus it is generally necessary to determine the characteristics of channel 3, at a given moment, in order to thwart the induced distortion of the transmitted signal e(n). In order to obtain an estimation of h(n), i.e. of the coefficients $\alpha_k$, $r_k$ and $\alpha_k$ of the model of channel 3, it is necessary to repeat this operation at a greater or lesser frequency depending on the rate at which the characteristics of the channel evolve.

A widespread method of estimating the channel consists in transmitting, via transmitter 1, signals e(n) which are predetermined and known to receiver 2, and in comparing the signals received r(n) in receiver 2, by means of a periodic or aperiodic correlation, with those which are expected there in order to deduce from them the characteristics of the channel. The aperiodic correlation of two signals of length N has a total length 2N−1 and is expressed, from the convolution product, by the relation:

$$\varphi_{a,b}(n) = a^*(-n) * b(n) = \sum_{m=0}^{N-1} a(m) \cdot (b(m+n))^{(1)},$$

$$[m] = 0, 1, \ldots, N - 1$$

for two signals a(n) and b(n) of finite length N, where the operator * denotes the complex conjugate operation.

The correlation of the received signal r(n) with the known transmitted signal e(n) translates as:

$$r(n) * e^*(-n) = [e(n) * h(n) + w(n)] * e^*(-n)$$

$$\varphi_{e,r}(n) = \varphi_{e,e^*h}(n) + \varphi_{e,w}(n) = \varphi_{e,e}(n) * h(n) + \varphi_{e,w}(n)$$

The result of the correlation operation constitutes the estimation of the impulse response of the channel: the quality or the precision of the estimation is all the better if $\Phi_{e,r}(n)$ tends towards h(n). The latter is directly dependant on the choice of transmitted sequence e(n); to optimise the estimation process, the signal e(n) should be chosen in such a way that the auto-correlation $\Phi_{e,e}(n)$ tends towards k·δ(n), k being a real number, and that $\Phi_{e,w}(n)/\Phi_{e,e}(n)$ tends towards 0. In fact, in this case, the estimation of the channel becomes:

$$\Phi_{e,r}(n) = k \cdot \delta(n) * h(n) + \Phi_{e,w}(n) = k \cdot h(n) + \Phi_{e,w}(n)$$

$$\Phi_{e,r}(n) \approx k \cdot h(n)$$

It has been demonstrated that no single sequence exists for which the function of aperiodic auto-correlation $\Phi_{e,e}(n) = k \cdot \delta(n)$.

One object of the present invention consists in using pairs of complementary sequences which have the property that the sum of their auto-correlations is a perfect Dirac function. Let s(n) and g(n), n=0, 1, ... N−1 be a pair of complementary sequences:

$$\Phi_{s,s}(n) + \Phi_{g,g}(n) = k \cdot \delta(n) \quad (1)$$

Several methods of constructing such complementary sequences are known in the literature: Golay complementary sequences, polyphase complementary sequences, Welti sequences, etc. By way of information, one will be able to refer, in this connection, to the following technical documents which deal with the introduction to complementary sequences and, in particular, to Golay complementary sequences as well as to a Golay correlator:

1) "On aperiodic and periodic complementary sequences" by Feng K., Shiue P. J. -S., and Xiang Q., published in the technical journal IEEE Transactions on Information Theory, Vol. 45, no. 1, January 1999,
2) "Korrelationssignale" by Lüke H. -D, published in the technical journal ISBN 3-540-54579-4, Springer-Verlag Heidelberg New York, 1992,
3) "Polyphase Complementary Codes" by R. L. Frank, published in the technical journal IEEE Transactions on Information Theory, November 1980, Vol. IT26, no. 6,
4) "Multiphase Complementary Codes" by R. Sivaswamy, published in the technical journal IEEE Transactions on Information Theory, September 1978, Vol. IT-24, no. 5,
5) "Efficient pulse compressor for Golay complementary sequences" by S. Z. Budisin, published in the technical journal Electronics Letters, Vol. 27, no. 3, January 1991,
6) "Complementary Series" by M. J. Golay, published in the technical journal IRE Trans; on Information Theory" Vol. IT-7, April 1961,
7) "Efficient Golay Correlator" by B. M. Popovic, published in the technical journal IEEE Electronics Letters, Vol. 35, no. 17, August 1999.

Reference can also be made to the descriptions of the documents U.S. Pat. Nos. 3,800,248, 4,743,753, 4,968,880, 7,729,612, 5,841,813, 5,862,182 and 5,961,463.

Figure 2:
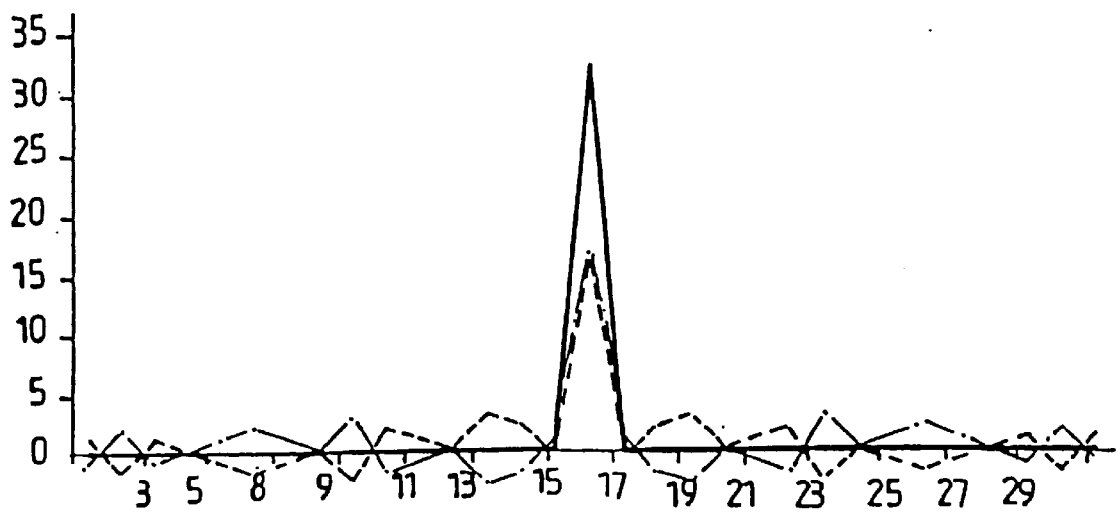

The property of complementary sequences in having a perfect auto-correlation sum is illustrated in FIG. 2, taking, by way of example, a pair of Golay complementary sequences s(n) and g(n) of length N=16 bits.

In FIG. 2 are plotted on the x-co-ordinates the time shifts in relation to perfect synchronisation. The possible shifts are numbered from 1 to 31 for the pair of sequences s(n) and g(n), and on the y-co-ordinates the correlations from −5 to +35. The curve in dashes corresponds to the auto-correlation $\Phi_{s,s}(n)$ of the sequence s(n); the curve in a dot-dash line to the auto-correlation $\Phi_{g,g}(n)$ of the sequence g(n): and the curve in an unbroken line to the sum of the auto-correlations $\Phi_{s,s}(n)$ and $\Phi_{g,g}(n)$. One can see that the curve in an unbroken line merges with the axis of the x-co-ordinates between points 0 and 15 and points 17 and 31, but it corresponds practically to a Dirac function between points 15 to 17.

It can be shown that the theoretically perfect auto-correlation properties of these complementary sequences may nevertheless only be exploited if their transmission can be ensured in such a manner that the occurrence of inter-correlations $\Phi_{s,g}(n)$ and/or $\Phi_{g,s}(n)$ is avoided.

SUMMARY OF THE INVETNION

According to one feature of the invention, a method is provided of estimating a transmission or telecommunications channel, in which method a composite signal of complementary sequences is used and in which a pair of complementary sequences s(n) and g(n) is transmitted after having time multiplexed them.

According to another feature of the invention, a method is provided of constructing the composite signal from a pair of complementary sequences s(n) and g(n) which are time multiplexed, this method making it possible to exploit the property $\Phi_{s,s}(n)+\Phi_{g,g}(n)$.

The method thus makes it possible to obtain an optimal estimation of the channel.

According to another feature, the composite signal is made up of two concatenated complementary sequences s(n) and (g(n) with, between them, a guard interval of a duration $N_{pg}$, greater than or equal to the length L of the impulse response of the channel to be estimated.

In this way one is assured that the replica of s(n) which has followed the longest path arrives before the replica of g(n) which has followed the shortest path. The transmitted signal is then in the form:

$$E(n)=s(n)+g(n-N-N_{pg}) \quad (2)$$

with $N_{pg}$ chosen in such a way that $N_{pg}>L-1$, and L being the length of the impulse response of the channel to be estimated.

According to another feature, a device is provided, intended to generate the composite signal and which comprises, connected in parallel, a first circuit generating the sequence s(n), with n=0, . . . , N−1, a second circuit generating the guard interval, $N_{pg}$=0, and a third circuit generating the sequence g(n), with n=0, . . . , N−1, the outputs of the generators being selectively connected to the output of the device by a time multiplexing circuit.

BRIEF DECRIPTION OF THE DRAWINGS

Figure 3:
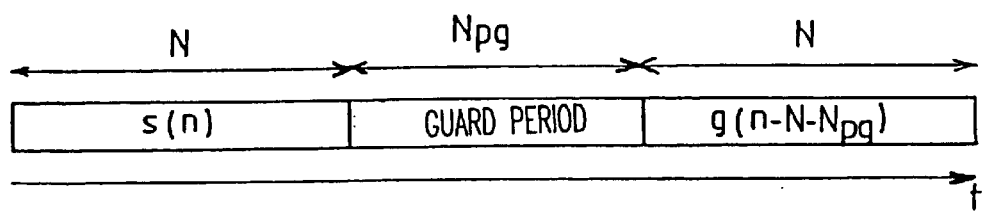
Figure 4:
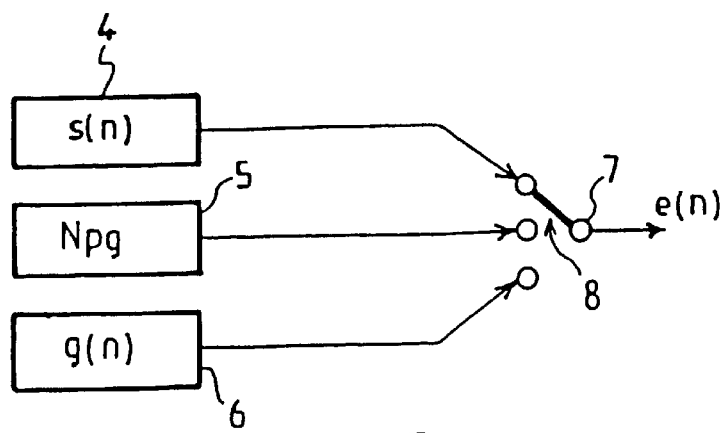
Figure 5:
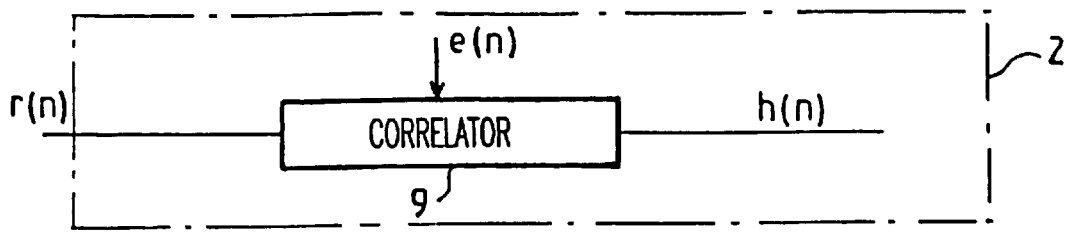
Figure 6:
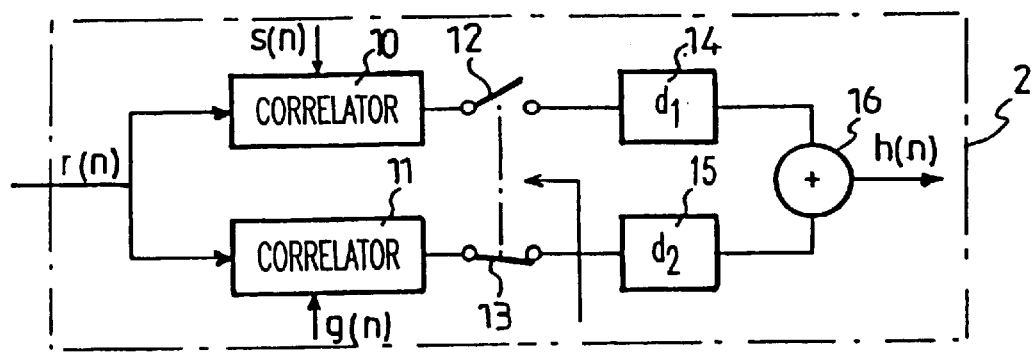
Figure 7:
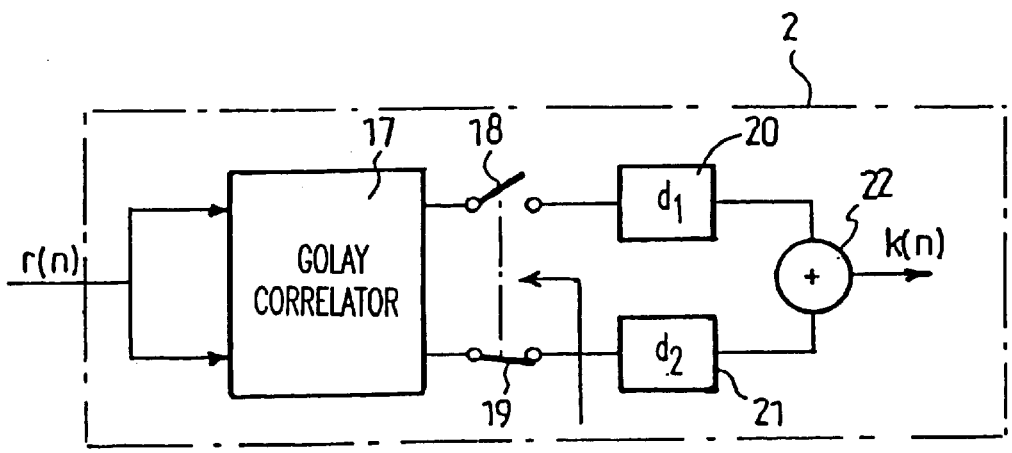

The features of the present invention mentioned above, as well as others, will appear more clearly in reading the description of embodiments, said description being made in connection with the attached drawings, amongst which:

FIG. 1 is a known diagram of a discrete model of a transmission channel,

FIG. 2 is a known curve illustrating the auto-correlation of two Golay complementary sequences and the sum of their auto-correlations, FIG. 3 illustrates the method of time multiplexing two complementary sequences, according to the invention, FIG. 4 is the diagram of an embodiment of the device provided to generate the composite sequence of the invention, FIG. 5 is a diagram illustrating a method of channel estimation by complete correlation, FIG. 6 is a block diagram illustrating a second method of channel estimation by alternating correlation, and FIG. 7 is a block diagram illustrating a third method of channel estimation using a Golay correlator.

DETAILED DESCRIPTION OF THE PREFERRED EMBODIMENTS

A device intended to generate the composite sequence e(n) is presented in FIG. 3. It implements the principle of time multiplexing two complementary sequences s(n) and g(n). As will be understood, therefore, it corresponds to the relation (2) mentioned above.

The device of FIG. 3 comprises, connected in parallel, a first circuit 4 generating the sequence s(n), with n=0, . . . , N−1, a second circuit 5 generating the sequence $N_{pg}$=0 and a third circuit 6 generating the sequence g(n), with n=0, . . . , N−1, the outputs of the generators being selectively connected to the output 7 of the device by a time multiplexing circuit 8.

The function of auto-correlation of the composite sequence obtained by this device can be written in the following manner:

$$\Phi_{e,e}(n)=\Phi_{s,s}(n)+\Phi_{g,g}(n)+\Phi_{s,g}(n-N-N_{pg})+\Phi_{g,s}(n+N+N_{pg}) \quad (3)$$

One can see that it will be possible to obtain the estimation of the channel in a window of size $2 \cdot N_{pg}+1$ for which this auto-correlation function is equal to $\Phi_{s,s}(n)+\Phi_{g,g}(n)$.

There will now follow a description of how the composite signal can be used to obtain an estimation of the channel, and in this connection several processes A, B and C will be described.

Estimation process A is based on a principle of complete correlation of the received signal with the composite sequence e(n), as FIG. 5 shows, by applying equation (3) above. In FIG. 5, the signal r(n) received in the receiver 2 is applied to the input of a correlator circuit 9 establishing a correlation between signal r(n) and signal e(n) of relation 2, the correlator 9 delivering at its output the estimation h(n) of the channel. The moment of reception of the composite sequence is assumed to be roughly known, which is necessary to synchronise the perfect estimation window of this estimation device. On the other hand, the impulse response is considered to be constant through all the composite sequence.

Estimation process B is based on a principle of partial and alternating correlation of the received signal with the sequences s(n) and g(n), as FIG. 6 shows.

In FIG. 6, the signal r(n) received in the receiver 2 is applied, on the one hand, to a first correlator 10, and, on the other hand, to a second correlator 11. Correlator 10 establishes the correlation of signal r(n) with sequence s(n) of relation (2), whilst the second correlator 11 establishes the correlation of signal r(n) with sequence g(n) of relation (2). The respective outputs of correlators 10 and 11 are connected to the mobile contacts 12 and 13 of a multiplexing device. Contact 12 is closed during the time interval N+N$_{pg}$, contact 13 being open; contact 12 is open for the duration N+N$_{pg}$, contact 13 being closed. Fixed contact 12 is connected to a circuit 14 with a delay d$_1$ and fixed contact 13 is connected to a circuit 15 of delay d$_2$. the outputs of circuits 14 and 15 are connected to the two inputs of an adder 16 which delivers the estimation h(n). The difference between delays d$_1$ and d$_2$ is equal to N+Npg.

This process makes it possible to suppress easily the inter-correlation components $\Phi_{sgs}(n)+\Phi_{g,s}(n)$. In fact, the signals at the output of correlators 11 and 12 are respectively:

$$\Phi_{s,s}(n)*h(n)+\Phi_{g,s}(n-N-N_{pg})*h(n)$$

and $$\Phi_{s,g}(n)*h(n)+\Phi_{g,g}(n-N-N_{pg})*h(n)$$

In taking into account, for a duration N+N$_{pg}$, only the output of the correlator by s(n), and then for a duration N+N$_{pg}$ only the output of the correlator by g(n), only the signals $\Phi_{s,s}(n)*h(n)$ and $\Phi_{g,g}(n-N-N_{pg})*h(n)$ are preserved. These signals are then delayed respectively by d$_1$ and d$_2$ bits and added, which gives finally at the output of the adder:

$$h(n)_{estimated} = [\varphi_{ss}(n-d_1) + \varphi_{gg}(n-N-N_{pg}-d_2)]*h(n)$$
$$= [\varphi_{ss}(n-d_1) + \varphi_{gg}(n-d_1)]*h(n)$$
$$= \delta(n-d_1)*h(n)$$
$$= h(n-d_1)$$

Which is the optimal estimation of the channel, with an offset shifted by close to d$_1$ bits, d$_1$ being known.

Process C consists in optimising the estimation process B from the point of view of the number of mathematical operations to be carried out, if the complementary sequences are constructed from polyphase complementary sequences, of which the Golay complementary sequences constitute the special case of a binary realisation. The correlations in relation to s(n) and in relation to g(n) can be realised in a single stage using a correlator optimised for polyphase complementary sequences and known under the name of Golay correlator (Extended Golay Correlator) which has been proposed in the literature. For this process C, the structure of the channel estimator then becomes that represented in FIG. 7.

The channel estimator of FIG. 7 comprises an input to which the signal r(n) received in the receiver 2 of FIG. 1 is applied. This input is connected, in parallel, to the two inputs of the Golay correlator 17 (EGC) which comprises two outputs selectively connected to the mobile contacts 18 and 19 of a multiplexing device. Contact 18 is closed during the time interval N+N$_{pg}$, contact 19 being open; contact 18 is open for the duration N+N$_{pg}$, contact 19 being closed. Fixed contact 18 is connected to a circuit 20 with a delay d$_1$ and fixed contact 19 is connected to a circuit 21 of delay d$_2$. The outputs of circuits 20 and 21 are connected to the two inputs of an adder 22 which delivers the estimation h(n). The difference between delays d$_1$ and d$_2$ is equal to N+N$_{pg}$.

What is claiemd is:

1. A method of estimating a transmission or telecommunications channel, comprising:

using two complementary sequences s(n) and g(n), wherein n=0, 1, . . . , N−1, that have a property that a sum of their auto-correlations $\Phi_{s,s}(n)+\Phi_{g,g}(n)$ is a Dirac function k·δ(n), where $\Phi_{s,s}(n)$ is the auto-correlation of s(n) and $\Phi_{g,g}(n)$ is the auto-correlation of g(n), k is an integer and δ(n) is a Dirac impulse;

time multiplexing the two sequences; and forming a composite signal that includes the two complementary sequences and provides the estimation of the channel.

2. The method of claim 1, wherein the forming step includes:

forming the composite signal by concatenting the two sequences with, between them, a guard interval of a duration greater than or equal to a length of an impulse response of the channel to be estimated.

3. An apparatus for generating, at an apparatus output, a composite signal that includes two complementary sequences s(n) and g(n), wherein n=0, 1, . . . , N−1, that have a property that a sum of their auto-correlations $\Phi_{s,s}(n)+\Phi_{g,g}(n)$ is a Dirac function k·δ(n), where $\Phi_{s,s}(n)$ is the auto-correlation of s(n) and $\Phi_{g,g}(n)$ is the auto-correlation of g(n), k is an integer and δ(n) is a Dirac impulse, the apparatus comprising:

a first circuit configured to generate s(n) at a first output;

a second circuit configured to generate a guard interval sequence N$_{pg=}$0 at a second output;

a third circuit configured to generate g(n) at a third output; and a time multiplexing circuit configured to selectively connect the first, second and third outputs to the apparatus output to obtain an estimation of a communications channel.

4. An apparatus for providing an estimation of a transmission channel based on correlation of a received signal r(n) and a composite sequence e(n), the apparatus comprising:

a receiver configured to receive the signal r(n); and a correlator configured to input the signal r(n) received in the receiver and establish a correlation between signal r(n) and signal e(n) according to the relation $e(n)=s(n)+g(n-N-N_{pg})$ that includes a composite signal that includes two complementary sequences s(n) and g(n), wherein n=0, 1, ..., N−1, that have a property that a sum of their auto-correlations $\Phi_{s,s}(n)+\Phi_{g,g}(n)$ is a Dirac function $k \cdot \delta(n)$
to provide the estimation of the channel, where $N_{pg}$ is a guard interval, $\Phi_{s,s}(n)$ is the auto-correlation of s(n) and $\Phi_{g,g}(n)$ is the auto-correlation of g(n), k is an integer, and $\delta(n)$ is a Dirac impulse.

5. An apparatus for providing an estimation h(n) of a transmission channel to which is applied a signal $e(n)=s(n)+g(n-N-N_{pg})$ that includes a composite signal that includes two complementary sequences s(n) and g(n), wherein n=0, 1, ..., N−1, that have a property that a sum of their auto-correlations $\Phi_{s,s}(n)+\Phi_{g,g}(n)$ is a Dirac function $k \cdot \Phi(n)$, where $N_{pg}$ is a guard interval, $\Phi_{s,s}(n)$ is the auto-correlation of s(n) and $\Phi_{g,g}(n)$ is the auto-correlation of g(n), k is an integer, and $\delta(n)$ is a Dirac impulse, the apparatus comprising:

a) a first correlator configured to provide a first correlation output based on correlation of s(n) and a signal r(n) received in a receiver;
   b) a second correlator configured to provide a second correlation output based correlation of g(n) and r(n);
   c) a multiplexer including,
      1) a first movable contact connected to the first correlation output and configured to be closed during a time interval $N+N_{pg}$ and open thereafter, and
      2) a second movable contact connected to the second correlation output and configured to be open during the time interval $N+N_{pg}$ and closed thereafter;
   d) a first delay circuit, connected to the first contact, configured to provide a first delay $d_1$ and to provide a first delay output;
   e) a second delay circuit, connected to the second contact, configured to provide a second delay $d_2$ and to provide a second delay output, wherein a difference between delays $d_1$ and $d_2$ is equal to $N+N_{pg}$; and
   f) an adder, configured to receive the first and second delay outputs and to provide the estimation h(n).

6. An apparatus for providing an estimation of a channel to which is applied a signal $e(n)=s(n)+g(n-N-N_{pg})$ that includes a composite that includes two complementary sequences s(n) and g(n), wherein n=0, 1, ..., N−1, that have a property that a sum of their auto-correlations $\Phi_{s,s}(n)+\Phi_{g,g}(n)$ is a Dirac function $k \cdot \delta(n)$, where $N_{pg}$ is a guard interval, $\Phi_{s,s}(n)$ is the auto-correlation of s(n) and $\Phi_{g,g}(n)$ is the auto-correlation of g(n), k is an integer, and $\delta(n)$ is a Dirac impulse, the apparatus comprising:

a) a Golay correlator having two inputs that receive in parallel a signal r(n) received in the receiver,
   b) a multiplexer including,
      1) a first movable contact connected to the first correlation output and configured to be closed during a time interval $N+N_{pg}$ and open thereafter, and
      2) a second movable contact connected to the second correlation output and configured to be open during the time interval $N+N_{pg}$ and closed thereafter;
   c) a first delay circuit, connected to the first contact, configured to provide a first delay $d_1$ and to provide a first delay output;
   d) a second delay circuit, connected to the second contact, configured to provide a second delay $d_2$ and to provide a second delay output, wherein a difference between delays $d_1$ and $d_2$ is equal to $N+N_{pg}$; and
   e) an adder, configured to receive the first and second delay outputs and to provide the estimation h(n).

* * * * *